No. 848,613. PATENTED MAR. 26, 1907.
A. A. FEHRENBACHER.
ROTARY WEED CUTTER AND CULTIVATOR.
APPLICATION FILED MAY 29, 1906.
2 SHEETS—SHEET 2
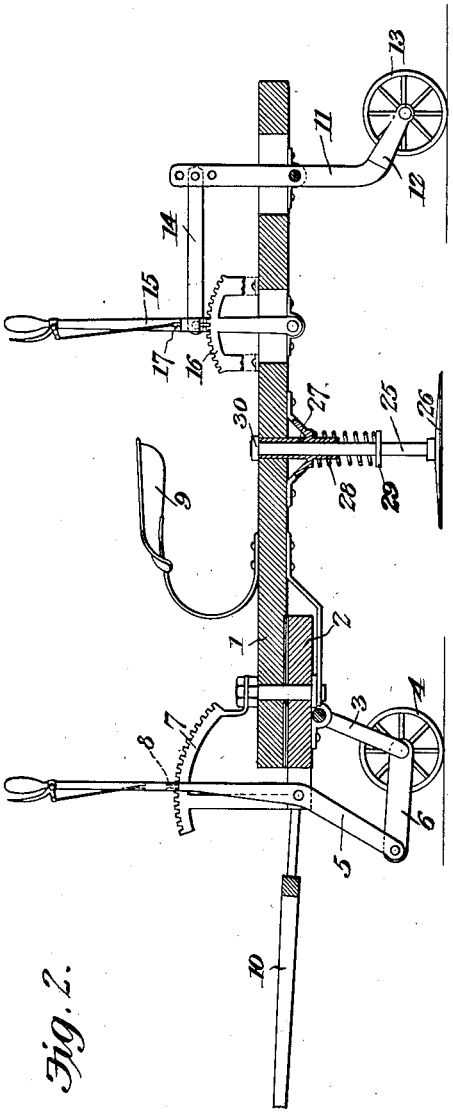
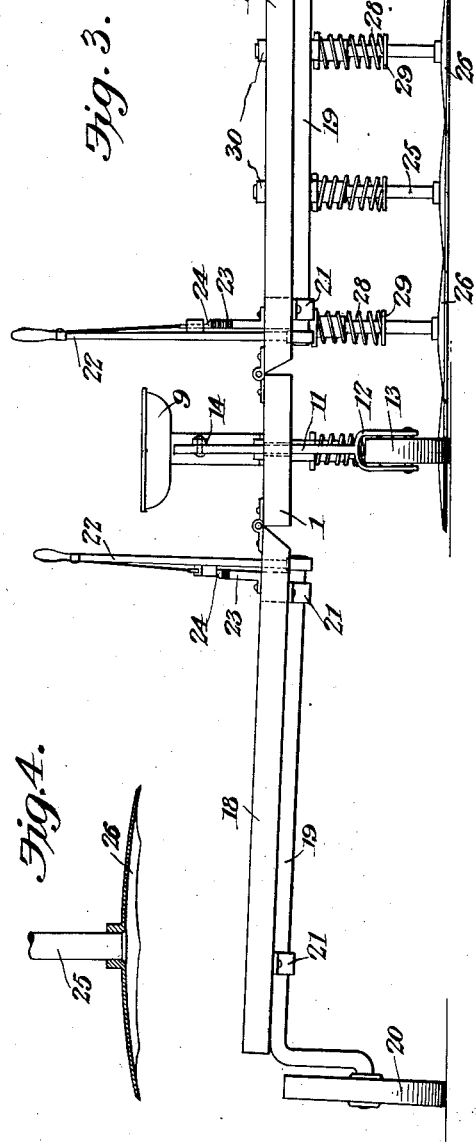
WITNESSES:
Anton A. Fehrenbacher INVENTOR
By C. A. Snow & Co
ATTORNEYS

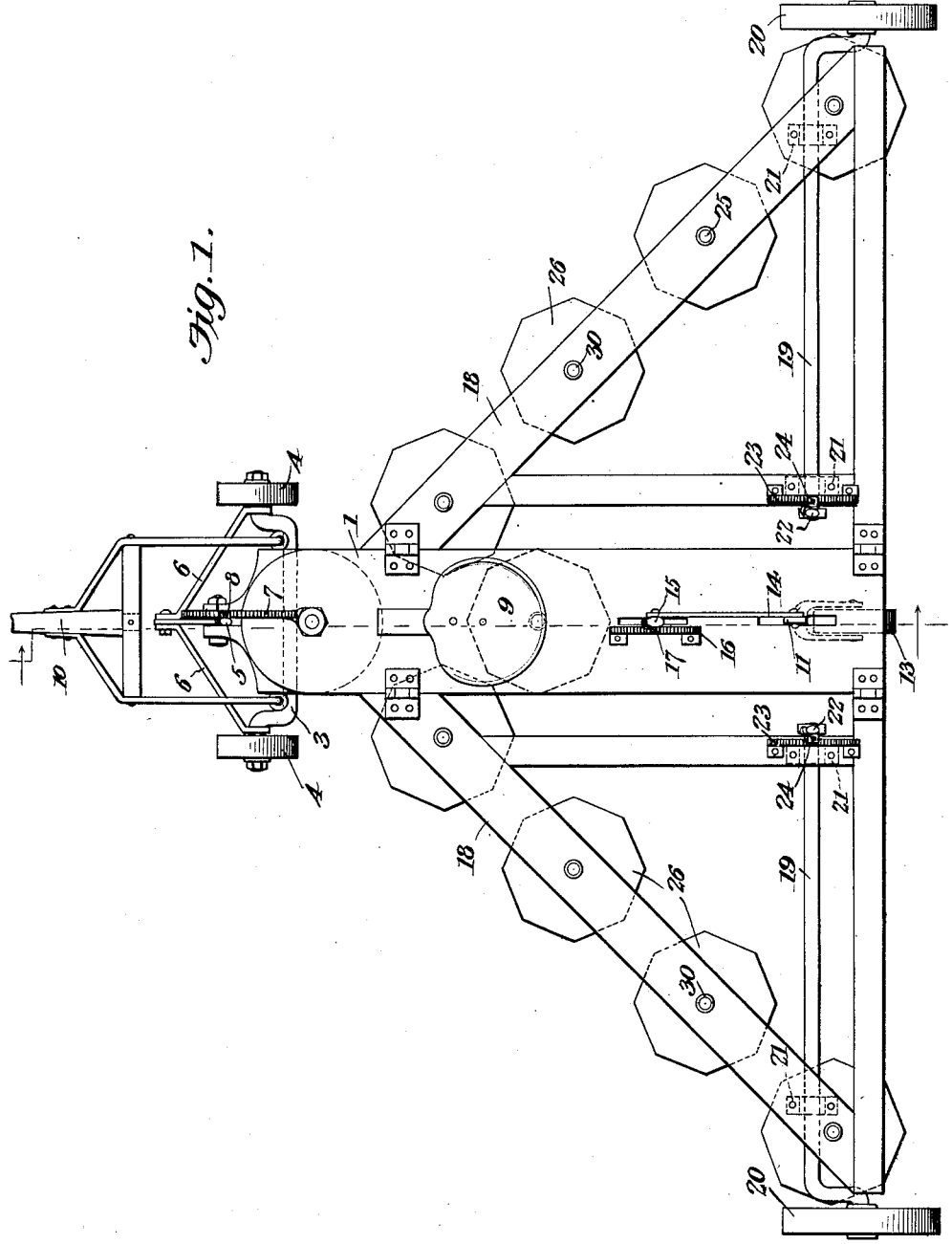

UNITED STATES PATENT OFFICE.

ANTON ALBERT FEHRENBACHER, OF CONDON, OREGON, ASSIGNOR OF ONE-HALF TO CLARENCE H. SMITH, OF CONDON, OREGON.

ROTARY WEED-CUTTER AND CULTIVATOR.

No. 848,613.  Specification of Letters Patent.  Patented March 26, 1907.

Application filed May 29, 1906. Serial No. 319,327.

*To all whom it may concern:*

Be it known that I, ANTON ALBERT FEHRENBACHER, a citizen of the United States, residing at Condon, in the county of Gilliam and State of Oregon, have invented a new and useful Rotary Weed-Cutter and Cultivator, of which the following is a specification.

This invention has relation to rotary weed-cutters and cultivators; and it consists in the novel construction and arrangement of its parts, as hereinafter shown and described.

The object of the invention is to provide a weed-cutter and cultivator having a central platform or frame which is adapted to be adjusted vertically at its front and rear ends—that is, two means of adjustment are provided and the said means may be operated independent of each other in order to give the platform the proper slant of inclination with relation to the surface of the ground. Triangular-shaped wings are hinged to the said platform, and each wing is provided with a means for adjusting the vertical position of its outer corner, said means being operated from the platform. The platform and the wings are provided with a number of horizontally-disposed disks mounted upon shafts which are rotatably supported and which may slide longitudinally in their bearings. Tension-springs are provided to retain said shafts and their attachments in their lowermost positions. The said disks are slightly concaved and are of octagonal configuration.
The supporting means of the forward end of the platform is pivoted thereto in order that short turns may be made with the implement.

In the accompanying drawings, Figure 1 is a top plan view of the weeder and cultivator. Fig. 2 is a longitudinal sectional view of the same. Fig. 3 is a rear end elevation of the same, and Fig. 4 is a transverse sectional view of one of the disks.

The frame 1 is pivotally attached at its forward end to the truck 2. Said truck is pivotally mounted upon the bell-crank axle 3, the wheels 4 being journaled at the lower ends of the bell-cranks thereof. The lever 5 is fulcrumed to the truck 2, and its working end is connected by means of the links 6 6 with the bell-crank ends of the axle 3. The power end of said lever passes up along the gear-rack 7 and is provided with the usual gear-engaging pin 8. The said power end of the lever 8 is within operating distance of the driver's seat 9. The tongue or shaft 10 is attached to the truck 2. The arm 11 is pivoted at the rear end of the platform 1 and is provided with the rearwardly-extending portion 12, to which is journaled the wheel 13. The upper end of said arm 11 extends above the platform 1 and is connected by means of the link 14 with the lever 15. Said lever in turn is fulcrumed to the platform 1 and extends along the gear-rack 16 and is provided with the usual gear-engaging pin 17. Said lever 15 is also in operating distance of the driver's seat.

The triangular wings 18 are hinged at one of their shorter edges to the longitudinal edges of the said platform 1. The hypotenuse of the triangle constituting the outline of said wings faces in the same direction as the forward end of the platform 1. Each wing 18 is provided at its rear end with a crank-axle 19, the wheel 20 being journaled at the end of the crank of each said axle, and the said axles in turn are journaled in the bearings 21 to its respective wing 18. The vertically-extending handle 22 is attached to the inner end of the axle and is adapted to swing in the arc of a circle in a plane parallel with the transverse axis of the said axle. The gear-segment 23 is fixed to the wing 18 adjacent the said handle 22, and the handle 22 is provided with an ordinary gear-engaging pin 24, which is adapted to enter the gear of the segment 23.

The platform 1 is provided at an intermediate point and in its central longitudinal axis with vertically-extending disk-shafts 25. The disk 26 is fixed to the lower end of said shaft, and the said shaft is adapted to move vertically through the bearing 27, which is secured to the said platform 1. The coil-spring 28 is interposed between the bearing 27 and the collar 29, attached to the said shaft 25. The tension of the said spring 28 is such as to have a tendency to maintain the shaft 25 and disk 26 in their lowermost positions. The downward movement of the said shaft 25 is limited by the enlarged head 30, which is adapted to engage the upper end of the shaft-bearing 27. The wings 18 18 are provided with a number of shafts 25, each of which is fitted with a disk 26, bearing 27, spring 28, collar 29, and enlarged head 30.

The shafts on each wing are arranged in rows which extend in alinement with the hypotenuse of the triangle, forming the outline of the wing. All of the said disks 26 are of the same contour, and a description of one will answer for all. The said disks are slightly concaved with the edges disposed in a downward direction. The disks are cut octagonally in horizontal plan, and consequently each edge of the disk has a slight curve between the corners of the octagon.

It will thus be seen that an implement is provided for weeding and cultivating which uses disks of peculiar configuration horizontally disposed and which may be adapted to work at any suitable depth below the surface of the soil. The main platform is so mounted that it may be tilted or slanted at either end, as conditions may require. The wings are hinged to the platform, so that they may be raised or lowered at their outer ends, and the hinged connections with the platform afford a flexible implement which is adapted to adjust itself to the contour of the ground.

The various adjustments and movements of the parts are obvious and it is thought unnecessary to explain them in detail here.

Having described my invention, what I claim as new, and desire to secure by Letters Patent, is—

1. An implement such as described consisting of a platform, wheels supporting said platform, a means for raising and lowering the platform, wings hinged to said platform, wheels supporting the outer ends of said wings, a means for raising and lowering the outer ends of said wings, vertically-journaled shafts carried by the platform and wings and horizontally-disposed disks attached to the ends of said shafts.

2. An implement such as described consisting of a platform, wheels supporting said platform, a means for raising and lowering said platform, triangular wings hinged to the longitudinal sides of said platform, wheels supporting the outer ends of said wings, a means for raising and lowering the outer ends of said wings, shafts vertically journaled in said wings and platform and having at their lower ends horizontally-disposed disks, the shafts and the wings being arranged in lines which extend parallel to the line representing the hypotenuse of the triangle of the wings.

In testimony that I claim the foregoing as my own I have hereto affixed my signature in the presence of two witnesses.

ANTON ALBERT FEHRENBACHER.

Witnesses:
J. F. WOOD,
D. R. PARKER.